(12) United States Patent
Yamashita et al.

(10) Patent No.: US 11,605,490 B2
(45) Date of Patent: Mar. 14, 2023

(54) INDUCTOR ELEMENT

(71) Applicant: TDK CORPORATION, Tokyo (JP)

(72) Inventors: Yasuhide Yamashita, Tokyo (JP);
Chiomi Sato, Tokyo (JP)

(73) Assignee: TDK CORPORATION, Tokyo (JP)

( * ) Notice: Subject to any disclaimer, the term of this patent is extended or adjusted under 35 U.S.C. 154(b) by 358 days.

(21) Appl. No.: 16/841,951

(22) Filed: Apr. 7, 2020

(65) Prior Publication Data

US 2020/0328021 A1 Oct. 15, 2020

(30) Foreign Application Priority Data

Apr. 10, 2019 (JP) .............................. JP2019-075042

(51) Int. Cl.

| H01F 27/255 | (2006.01) |
|---|---|
| H01F 27/02 | (2006.01) |
| H01F 17/04 | (2006.01) |
| H01F 3/08 | (2006.01) |
| B29C 43/18 | (2006.01) |
| H01F 41/04 | (2006.01) |

(52) U.S. Cl.
CPC ........... *H01F 27/255* (2013.01); *B29C 43/18* (2013.01); *H01F 3/08* (2013.01); *H01F 17/043* (2013.01); *H01F 17/045* (2013.01); *H01F 27/02* (2013.01); *H01F 41/04* (2013.01); *H01F 2017/048* (2013.01); *Y10T 428/32* (2015.01)

(58) Field of Classification Search
None
See application file for complete search history.

(56) References Cited

U.S. PATENT DOCUMENTS

| 6,392,525 B1 * | 5/2002 | Kato ..................... H01F 3/08 |
| | | 336/200 |
| 7,449,984 B2 * | 11/2008 | Kawarai ............... H01F 17/045 |
| | | 336/83 |
| 8,466,764 B2 * | 6/2013 | Bogert .................... H01F 5/003 |
| | | 336/83 |
| 8,717,135 B2 * | 5/2014 | Wada ...................... H01F 27/02 |
| | | 336/83 |
| 9,019,062 B2 * | 4/2015 | Hejny ...................... H01F 3/10 |
| | | 336/212 |
| 9,117,580 B2 * | 8/2015 | Wu ...................... H01F 27/2823 |
| 9,269,486 B2 * | 2/2016 | Park ..................... H01F 27/255 |
| 9,905,349 B2 * | 2/2018 | Park ....................... H01F 27/02 |
| 10,304,610 B2 * | 5/2019 | Maeda .................. H01F 27/255 |

(Continued)

FOREIGN PATENT DOCUMENTS

| CN | 105225802 A | 1/2016 |
| CN | 106816267 A | 6/2017 |

(Continued)

*Primary Examiner* — Kevin M Bernatz
(74) *Attorney, Agent, or Firm* — Oliff PLC

(57) ABSTRACT

The present invention is an inductor element having a conductor wound in a coil form, and a core part surrounding the coil and including a magnetic powder and a resin. The core part includes a top board part and a bottom board part respectively covering both ends of the coil, and an outer circumference part positioned at an outer circumference side of the coil, and a resin content of the outer circumference part is larger than a resin content of the top board part and also larger than a resin content of the bottom board part.

8 Claims, 8 Drawing Sheets

(56) References Cited

U.S. PATENT DOCUMENTS

| | | | | |
|---|---|---|---|---|
| 10,861,630 B2* | 12/2020 | Ryu | .......................... | H01F 3/10 |
| 10,886,056 B2* | 1/2021 | Yamashita | .......... | H01F 27/2823 |
| 10,984,941 B2* | 4/2021 | Yamashita | .............. | H01F 27/02 |
| 11,342,107 B2* | 5/2022 | Choi | ....................... | H01F 27/36 |
| 2015/0371752 A1* | 12/2015 | Park | ..................... | H01F 27/255 |
| | | | | 336/200 |
| 2017/0133143 A1 | 5/2017 | Maeda | | |
| 2018/0322998 A1* | 11/2018 | Yamashita | .............. | H01F 41/04 |

FOREIGN PATENT DOCUMENTS

| | | |
|---|---|---|
| CN | 108806920 A | 11/2018 |
| JP | 2001-185421 A | 7/2001 |
| JP | 2002-252120 A | 9/2002 |
| JP | 2009-033051 A | 2/2009 |

* cited by examiner

INDUCTOR ELEMENT

TECHNICAL FIELD

The present invention relates to an inductor element.

BACKGROUND

An inductor element in which a coil is embedded inside of a core including a magnetic powder and a resin is known as one example of an inductor element. As a method of producing such inductor element, Patent Document 1 discloses a method shown in below.

In Patent Document 1, a magnetic powder and a thermosetting resin are mixed and two green compacts are formed by compacting.
Then, these green compacts are re-pressurized while holding a coil part in between, and thermosetting is performed. Thereby, the coil component of the inductor element and the like is obtained. However, Patent Document 1 tends to easily cause cracks at a bonding interface between the green compacts and also along an end face of the coil part, and the core could not achieve a higher density.

Particularly in recent years, the inductor element has developed to correspond to larger current and the coil is demanded to attain an improved inductance. Thus, it is necessary that a core has a higher density. As a method to attain this, reduction of a resin component in the green compact is considered in order to increase a ratio of the magnetic powder, however, when the resin component is reduced, a molding property of the core is deteriorated and cracks tend to easily form.

[Patent Document 1] JP Patent Application Laid Open No. 2002-252120

SUMMARY

The present invention was attained in view of above situation, and the object is to provide an inductor element rarely forming cracks and also having a high inductance.

In order to attain the above object, the inductor element according to the present invention is an inductor element including a coil having a conductor wound in a coil form, and a core part surrounding the coil and including a magnetic powder and a resin, wherein the core part includes a top board part and a bottom board part which respectively covers both ends of the coil, and an outer circumference part positioned at an outer circumference side of the coil, and a resin content of the outer circumference part is larger than a resin content of the top board part and also larger than a resin content of the bottom board part.

By having the above-mentioned constitution, the inductor element according to the present invention attains enhanced adhesiveness between each part near an interface of the top board part and the outer circumference part and near the interface of the bottom board part and the outer circumference. Therefore, the inductor element according to the present invention can effectively suppress cracks from forming to the core part. Also, although the reason is not necessarily clear, the inductor element according to the present invention has a high inductance.

Preferably, the resin content of the top board part is 0.5 to 4.0 parts by weight and the resin content of the bottom board part is 0.5 to 4.0 parts by weight with respect to 100 parts by weight of the magnetic powder. The resin content of the outer circumference part is 2.0 to 6.0 parts by weight with respect to 100 parts by weight of the magnetic powder.

As the resin content is within the above-mentioned range in each part of the core part, cracks are prevented from forming and a density of the magnetic material can be increased. Also, an inductance of the inductor element is improved.

Also, since the inductor element according to the present invention has a high adhesiveness between the top board part and the outer circumference part and between the bottom board part and the outer circumference part, a resin content of the center part of the core part positioned at the inner circumference side of the coil can be decreased. More specifically, the resin content of the center part can be 2.0 parts by weight or less with respect to 100 parts by weight of the magnetic powder.

By constituting as such, the density of the magnetic material of the center part increases in relativity, and a higher inductance is obtained.

Also, in the inductor element according to the present invention, the resin content of the center part is smaller than the resin content of the top board part and also smaller than the resin content of the bottom board part. The resin content of the core part in each part increases in the order of the center part<the top board part (bottom board part)<the outer circumference part.

By adjusting the resin content of the above-mentioned parts as such, the adhesiveness of the core part is enhanced even more and an inductance improves.

DETAILED DESCRIPTION

Hereinafter, the present invention is described based on the embodiments shown in figures, however, the present invention is not limited thereto.

First Embodiment

Figure 1A:
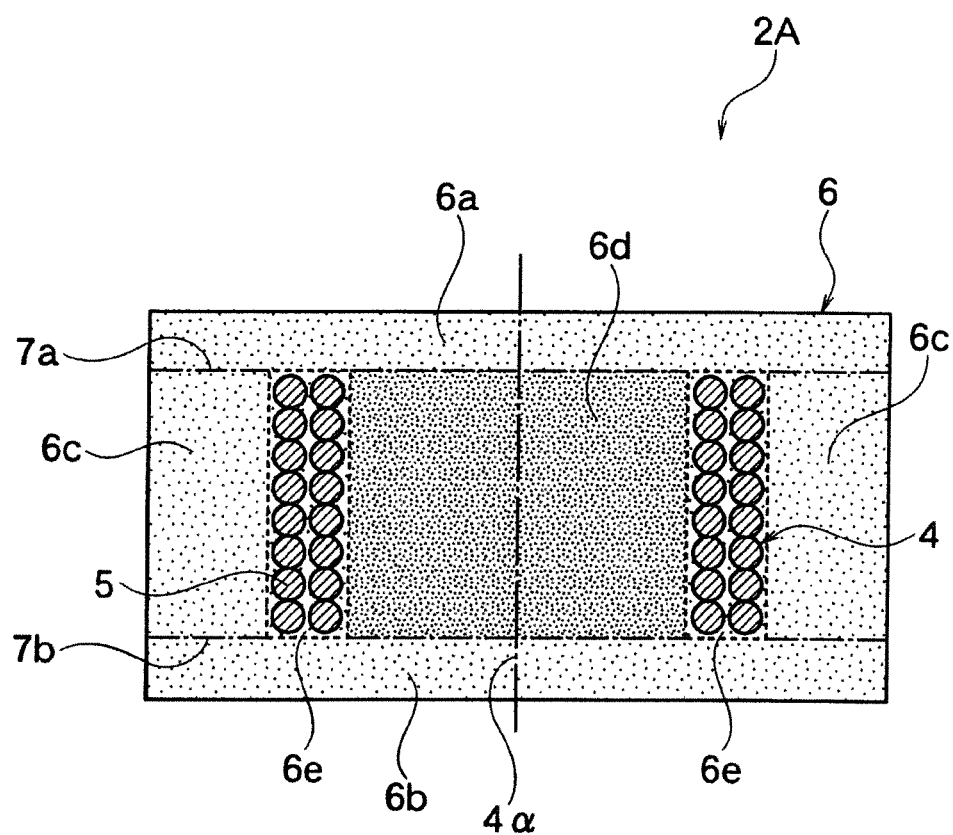
FIG. 1A is a cross section of an inductor element according to an embodiment of the present invention.
Figure 2:
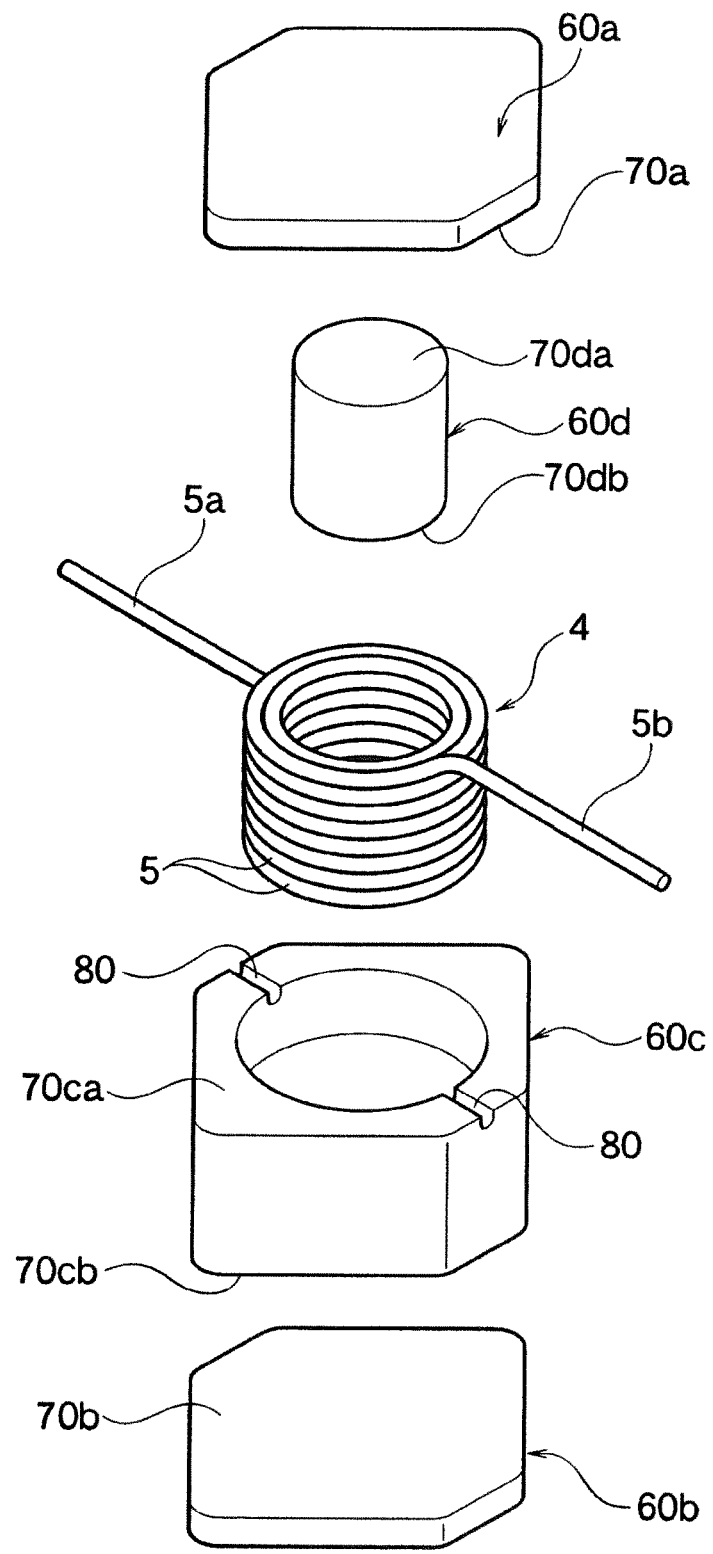
FIG. 2 is a perspective diagram of a preliminary molded body and a coil used during a production of the inductor element shown in FIG. 1A.

FIG. 1A is a cross section of an inductor element 2A of an embodiment of the present invention. Further, FIG. 2 is a perspective diagram showing a preliminary molded body and a coil during production of the inductor element 2A. As shown in FIG. 1A, the inductor element 2A includes a coil 4 and a core part 6. Note that, FIG. 1A shows the cross section which passes through a center axis 4a of the coil 4 and parallel with the center axis 4a.

As shown in FIG. 2, the coil 4 is formed by winding a conductor 5 in a coil form, and an axis of the coil is approximately parallel with Z axis. A number of times of winding and a number of layers formed by winding are not particularly limited, and these may be determined accordingly depending on a size and desired properties of the inductor element 2A. In the present embodiment, by winding the conductor 5 in a coil form, a cross section (X-Y cross section) perpendicular to the center axis 4a of the coil 4 forms a circular ring form. Note that, a shape of the X-Y cross section of the coil 4 is not particularly limited, and it may be an oval ring form, a rectangular ring form, a triangular ring form, and the like.

Also, the coil 4 has lead parts 5a and 5b which extends approximately perpendicular to the center axis 4a at upper part in Z axis direction. In FIG. 1A, the lead parts 5a and 5b of the coil 4 are not shown, and these are formed so that these can be taken out of the core part 6. Note that, in each figure, Z axis is a direction parallel with the center axis 4a; and X axis, Y axis, and Z axis are perpendicular to each other.

The conductor 5 constituting the coil 4 is constituted from conductive metals, and if necessary, an outer circumference of the conductive metals is coated with an insulation coating layer. The conductive metals are not particularly limited, and for example, Cu, Al, Fe, Ag, Au, alloy including these metals, and the like may be mentioned. Also, the insulation coating layer is not particularly limited, and for example, polyurethane, polyamideimide, polyimide, polyester, polyester-imide, polyester-nylon, and the like may be mentioned. Further, in the present embodiment, a horizontal cross section of the conductor 5 is circle form, however, it is not particularly limited; and it may be an oval form, a rectangular form, and the like.

In the present embodiment, the core part 6 has a prismatic shape as a whole, however, it is not particularly limited to this, and it may be a circular column shape, an oval column shape, and the like. An upper face and a lower face of the core part 6 are approximately perpendicular to Z axis. A side face of the core part 6 is approximately perpendicular to a plane including X axis and Y axis. Further, a size of the core part 6 corresponds to a size of the inductor element 2A (not including the lead parts 5a and 5b), however, it is not particularly limited to this, and for example it may be a size which is within a rectangular parallelepiped shape or a cubic shape having 2 to 17 mm×2 to 17 mm×1 to 17 mm.

As shown in FIG. 1A, the core part 6 includes the top board part 6a and the bottom board part 6b which cover top and bottom end faces of the coil 4; the outer circumference part 6c positioned at the outer circumference side of the coil 4; and a center part 6d positioned at an inner circumference side of the coil 4. Also, a space 6e between the core 6 and the conductor 5 constituting the coil 4 is embedded with a magnetic powder and a resin which constitute the core part 6.

As mentioned in above, the core part 6 has the magnetic powder and the resin (binder). A material of the magnetic powder is not particularly limited, and for example, ferrites such as Mn—Zn, Ni—Cu—Zn, and the like; metals such as Fe—Si (iron-silicon), sendust (Fe—Si—Al; iron-silicon-aluminum), Fe—Si—Cr (iron-silicon-chromium), permalloy (Fe—Ni), and the like may be mentioned. Preferably, Fe—Si or Fe—Si—Cr may be mentioned.

Also, in order to attain a high insulation property, the magnetic powder may be subjected to a surface treatment by organic coating or inorganic coating such as BN, $SiO_2$, MgO, $Al_2O_3$, and the like. Further, a crystal structure of the magnetic powder is not particularly limited, and it may be an amorphous, a crystalline, and the like.

As a type of the resin included in the core part 6, a thermosetting resin is used. As the thermosetting resin, for example, an epoxy resin, a phenol resin, a melamine resin, a urea resin, a furan resin, an alkyd resin, an unsaturated polyester resin, diallylphthalate resin, and the like; a composite resin of these; and the like may be mentioned.

One of the characteristic of the present embodiment is that the core part 6 has different resin contents in the parts 6a to 6d. Particularly, the resin content of the outer circumference part 6c is designed to be larger than the resin content of the top board part 6a and also larger than the bottom board part 6b. Further detailed constitutions and effects will be described in below, and by adjusting the resin contents of the parts 6a to 6d of the core part 6, the adhesiveness between each part is enhanced and also a higher inductance can be obtained.

Next, a method of producing the inductor element 2A shown in FIG. 1A is described using FIG. 2.

Four preliminary molded bodies 60a to 60d and the coil 4 (insert member) constituted by a coreless coil are integrally formed into one body; thereby the inductor element 2A of the present embodiment is produced. As steps of production, first, grains which are a raw material of the preliminary molded body 60 are produced, then the grains are performed with a preliminary compression molding in a form of each part of the core part 6. Then, the preliminary molded bodies 60a to 60d obtained as such and the coil 4 are combined as shown in FIG. 2, and then a main compression molding is performed.

First, the grains as the raw material of the preliminary molded body 60 are produced. A method for producing the grains is not particularly limited, and for example, the resin is added to the magnetic powder and stirred, then it is dried. Thereby, the grains can be produced. In this stirring step, the resin may be diluted by a solvent and then added. As a solvent used at this point, for example, ketones such as acetone and the like may be mentioned. Also, for the production of the grains, after the resin is added to the magnetic powder and stirred, a mesh may be used to remove large grains.

The particle size of the magnetic powder used in the production of the grains is not particularly limited, and for example, the magnetic powder having an average particle size of 0.5 to 50 μm can be used. Note that, in case of forming an inorganic coating or an organic coating to the surface of the magnetic powder, the surface treatment may be carried out by a sol-gel method a chemical conversion treatment such as a phosphate conversion treatment, and the like.

The resin content of the grains is adjusted per each preliminary molded body 60a to 60d so that the resin content differs depending on the parts 6a to 6d of the core part 6 after the main compression molding. A specific range of the resin content is described in below. Note that, the present embodiment does not perform a binder removal treatment, thus the resin content does not change during the production. Therefore, the resin content (charged amount) of the preliminary molded body 60 is equivalent of the resin content of the core part 6.

Next, the preliminary molded bodies 60a to 60d are produced using the above-mentioned grains. The grains including the magnetic powder and the resin are filled in a cavity of a metal mold, then the preliminary compression molding is performed, thereby the preliminary molded bodies 60a to 60d are produced. Note that, the metal mold for the preliminary compression molding is determined depending on the shape of the preliminary molded bodies 60a to 60d. A pressure during the preliminary compression molding is $2.5\times10^2$ to $1\times10^3$ MPa (2.5 to 10 t/cm$^2$).

Here, the preliminary molded body 60a is a member constituting the top board part 6a of the core part 6 after the main compression molding, and the preliminary molded body 60a has a polygonal board shape. A thickness of the preliminary molded body 60a is not particularly limited, and preferably it may be designed so that the thickness of the top board part after the main compression molding is 1/10 to 4/10 of the thickness of the inductor element 2A. Also, the preliminary molded body 60b is a member constituting the bottom board part of the core 6 after the main compression molding, and the shape and the thickness are same as the preliminary molded body 60a.

Regarding the preliminary molded bodies 60a and 60b constituting the top board part 6a and the bottom board part 6b, the charged amount of the grains is preferably adjusted so that the resin content is within the range of 0.5 parts by weight to 4.0 parts by weight with respect to 100 parts by weight of the magnetic powder.

Also, the preliminary molded body 60c is a member constituting the outer circumference part 6c of the core 6 after the main compression molding, and has a prismatic ring shape. Note that, the upper face and the bottom face of the preliminary molded body 60c have a same shape as an outer circumference shape of the preliminary molded bodies 60a and 60b. The shape of the inner circumference side of the ring shape is a circular shape which corresponds to the outer circumference of the coil 4. Also, a height of Z axis direction of the preliminary molded body 60c is preferably designed so that it is 1.1 times to 1.5 times of the height of the coil 4 in Z axis direction.

The resin content of the preliminary molded body 60c constituting the outer circumference part 6c is larger than the resin content of the preliminary molded body 60a and also larger than the resin content of preliminary molded body 60b. Furthermore, the charged amount of the grains is preferably adjusted so that the resin content of the preliminary molded body 60c is within the range of 2.0 parts by weight to 6.0 parts by weight with respect to 100 parts by weight of the magnetic powder. More preferably, it is 2.0 parts by weight to 5.0 parts by weight.

Further, the preliminary molded body 60d is a member constituting the center part 6d of the core 6 after the main compression molding, and the preliminary molded body 60d has a circular column shape which corresponds to the shape of inner circumference side of the coil 4. Note that, the preliminary molded body 60d may be a square pillar shape, an elliptical cylinder shape, and the like. A height of the preliminary molded body 60d in Z axis direction is preferably designed so that it is 0.9 times to 0.998 times of the height of the coil 4 in Z axis direction. Also, a diameter of the preliminary molded body 60c is not particularly limited as long as it can be contained inside the coil 4.

Regarding the preliminary molded body 60d constituting the center part 6d, the charged amount of the grains is preferably adjusted so that the resin content is 2 parts by weight or less with respect to 100 parts by weight of the magnetic powder. Further preferably, the resin content of the preliminary molded body 60d is smaller than the resin contents of the preliminary molded bodies 60a to 60c. The lower limit of the resin content of the preliminary molded body 60d may be 0 parts by weight. Note that, in order to secure a molding property during the preliminary compression, a small amount of the resin may be included.

Note that, the density of the preliminary molded bodies 60a to 60d is not particularly limited, and for example it may be 4.0 to 6.5 g/cm$^3$.

Next, the obtained preliminary molded bodies 60a to 60d and the coil 4 (insert member) are placed inside the cavity of the metal mold different from the one used for producing the preliminary molded body, then the main compression molding (compression bonding) is performed. Thereby, the inductor element 2A is obtained.

A pressure of the main compression molding is not particularly limited, and for example it may be $1.0\times10^2$ to $8.0\times10^2$ MPa (1.0 to 8.0 t/cm$^2$). The pressure of the main compression molding may be larger, smaller, or equal to the pressure of the preliminary compression molding. Note that, the pressure of the main compression molding is about 40% to 80% of the pressure (100%) of the preliminary compression molding. Further preferably, it may be about 50% to 60%. By making the pressure of the main compression molding lower than the pressure of the preliminary compression molding, it tends to easily prevent the coil 4 from being out of position or deforming the coil shape which tend to occur after the main compression molding. Further, as the pressure of the preliminary compression molding becomes larger compared to the pressure of the main compression molding, a withstand voltage property tends to improve easily.

Note that, each of preliminary molded bodies 60a to 60d is formed with bonding faces 70a to 70d. Further, a bonding face 70a of the preliminary molded body 60a, a bonding face 70ca of the preliminary molded body 60c, and a bonding face 70da of the preliminary molded body 60d are bonded facing against each other during the main compression, thereby forms a bonding interface 7a shown in FIG. 1A. Similarly, a bonding face 70b of the preliminary molded body 60b, a bonding face 70cb of the preliminary molded body 60c, and a bonding face 70db of the preliminary molded body 60d are bonded facing against each other and forms a bonding interface 7b. These bonding interfaces 7a and 7b may remain in a discontinuous form which can be observed in a cross section of the core 6 after the main compression. Alternatively, the bonding interfaces 7a and 7b may not remain.

Note that, a guide groove 80 may be formed to either one or both of the bonding faces 70a and 70ca, and the lead parts 5a and 5b of the coil 4 can be pulled to the outside.

Also, the inductor element 2A taken out of the metal mold after the main compression is performed with a heat treatment, thereby the resin can be completely cured. Specifically, the inductor element 2A may be heat treated at a temperature higher than the temperature at which the resin begins to cure, a detailed temperature is determined accordingly depending on the resin being used.

As the inductor element, it is demanded that the core part has a higher density and an improved inductance of the core part are demanded. As a method to attain this, it is considered to reduce the resin component in the core part, and to increase a ratio of the magnetic powder in relativity. However, in case the resin content in each part of the core part is equally reduced, cracks tend to easily occur and an inductance cannot be improved sufficiently. Also, in case the resin content in each part of the core part is increased equally in order to ensure the adhesiveness of the core part, then the inductance decreases.

On the other hand, in the present embodiment, the resin content of the outer circumference part 6c is larger than the resin content of the top board part 6a and also larger than the resin content of bottom board part 6b. Thereby, the inductor element 2A can suppress cracks from forming and can improve the inductance. Particularly, in the inductor element 2A of the present embodiment, by making the resin content of the outer circumference part 6c larger, even if a total resin content of the entire core part is increased, a high inductance can be obtained.

It is not necessarily clear how cracks are suppressed and the inductance is improved. However, by satisfying the constitution of the present embodiment, a bonding force at the bonding interfaces 7a and 7b of the core part 6 is enhanced and decreases an internal air space at the interface, thus an apparent permeability increases, thereby cracks are suppressed from forming and the inductance is improved.

Note that, a resin content of the outer circumference part 6c is preferably 1.0 times or more and more preferably 1.5 times or more of the resin content of the top board part 6a or the resin content of the bottom board part 6b. By adjusting the resin content within such ratio, cracks can be prevented and a high inductance can be ensured.

As mentioned in above, in the present embodiment, the resin content of the outer circumference part 6c is larger than the resin content of the top board part 6a and also larger than the resin content of the bottom board part 6b. In addition to this, in the present embodiment, the resin content of the top board part 6a and the resin content of the bottom board part 6b are preferably within a range of 0.5 parts by weight to 4.0 parts by weight with respect to 100 parts by weight of the magnetic powder. The resin content of the outer circumference part 6c is within a range of 2.0 parts by weight to 6.0 parts by weight (more preferably 2.0 to 5.0 parts by weight) with respect to 100 parts by weight of the magnetic powder.

By having 0.5 parts by weight or more of the resin contents of the top board part 6a and the resin content of the bottom board part 6b, cracks are effectively suppressed from forming around the upper part and the lower part in Z axis direction of the coil 4. Also, since the resin contents of the top board part 6a and the resin content of the bottom board part 6b are 4.0 parts by weight or less, the density of the magnetic powder in the core part 6 does not decrease and the permeability of the obtained inductor element 2A is increased.

By having 2.0 parts by weight or more of the resin content of the outer circumference part 6c, a decrease of permeability due to the cracks can be suppressed. Also, by having 6.0 parts by weight or less of the resin content of the outer circumference part 6c, the density of the magnetic powder in the core part 6 does not decrease, the permeability of the obtained inductor element 2A is increased.

Note that, the resin content of the top board part 6a and the resin content of the bottom board part 6b may be same or different. Note that, in case the resin content of the top board part 6a and the resin content of the bottom board part are the same, the preliminary molded bodies 60a and 60b can be constituted by the same member, and a production cost can be reduced.

Also, in the present embodiment, a strength of the core part 6 as a structure is ensured by a bonding strength of the outer circumference part 6c with the top board part 6a and the bottom board part 6b, thus the resin content of the center part 6d can be decreased. That is, the center part 6d is bonded with the top board part 6a and the bottom board part 6b by a bonding force of the outer circumference part 6c with the top board part 6a and the bottom board part 6b.

Therefore, the center part 6d preferably has a high permeability as a magnetic core of the inductor element 2A. Specifically, the resin content of the center part 6d is preferably 2.0 parts by weight or less with respect to 100 parts by weight of the magnetic powder, and it may be 0 parts by weight. By constituting as such, the inductor element 2A can attain a high permeability and also an improved inductance.

Also, in the present embodiment, by having the resin content of the center part 6d within the range mentioned in above and by having a smaller resin content in relativity than in other parts 6a to 6c; the resin contents of parts 6a to 6d of the core part are constituted to have the resin content in an increasing order of the center part<the top board (bottom board)<the outer circumference part.

By adjusting the resin content of each part as such, the adhesiveness between each part of the core part 6 is even more enhanced and an effect of improving the inductance can be enhanced. Note that, the resin content of the center part 6d is preferably 0.15 times or more and less than 1.0 times of the resin content of the top board part 6a and of the resin content of the bottom board part 6b.

Second Embodiment

Hereinafter, the second embodiment of the present invention is described based on FIG. 1B and FIG. 3. Note that, the same constitution as the first embodiment will be omitted from explaining, and the same numerical reference will be given.

Figure 1B:
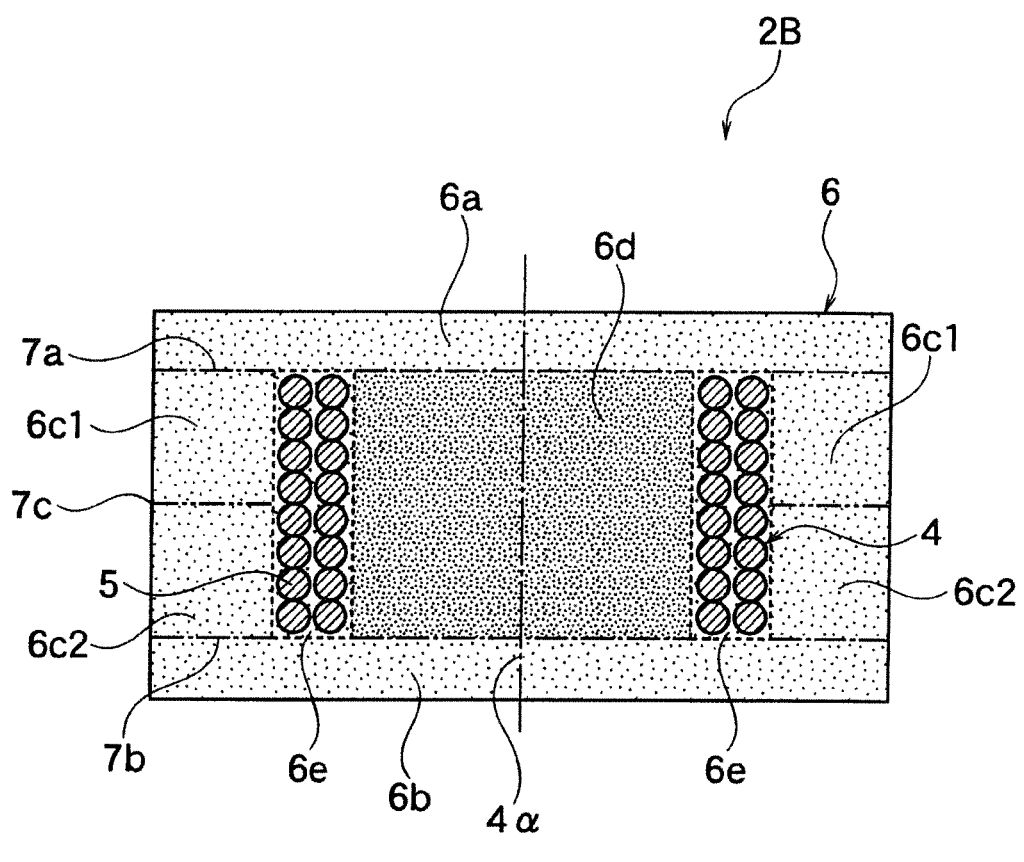
FIG. 1B is a cross section of an inductor element according to other embodiment of the present invention.
Figure 3:
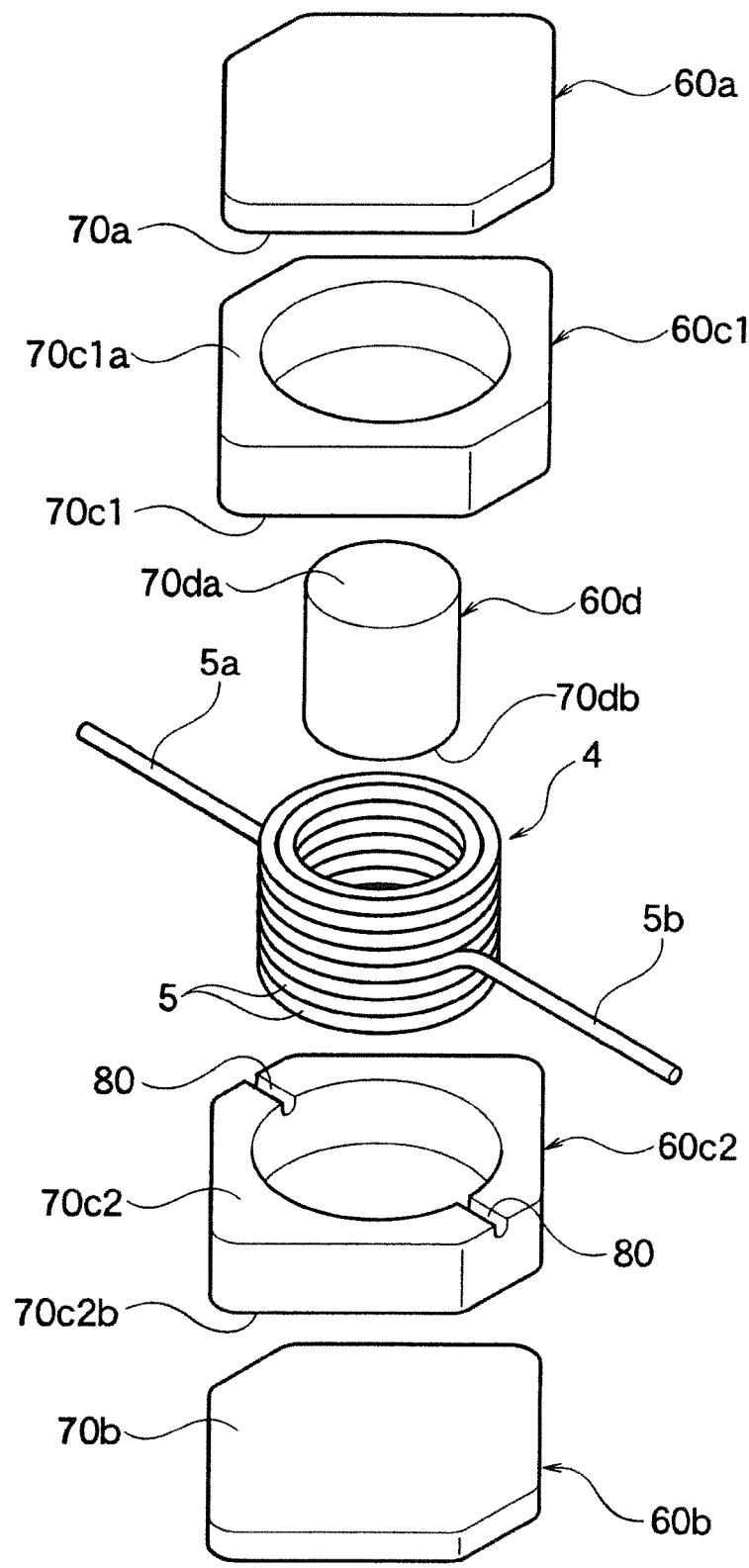
FIG. 3 is a perspective diagram of a preliminary molded body and a coil used in a production of the inductor element shown in FIG. 1B.

FIG. 1B is a cross section of the inductor element 2B according to the second embodiment, and FIG. 3 is a perspective view of a preliminary molded body and an insert member during the production of the inductor element 2B.

As shown in FIG. 3, in the inductor element 2B, a preliminary molded body 60c constituting the outer circumference part 6c is further separated into two preliminary molded bodies 60c1 and 60c2. Therefore, the inductor element 2B is produced by integrating the insert member and total of five preliminary molded bodies 60a, 60b, 60c1, 60c2, and 60d as one body. Note that, the constitutions of the inductor element 2B other than mentioned in above are same as the inductor element 2A of the first embodiment and has same effects.

When producing the inductor element 2B, a bonding face 70a of the preliminary molded body 60a, a bonding face 70c1a of the preliminary molded body 60c1, and a bonding face 70da of the preliminary molded body 60d are bonded against each other and forms discontinuous bonding interface 7a which is shown in FIG. 1B. Also, a bonding face 70b of the preliminary molded body 60b, a bonding face 70c2b of the preliminary molded body 60c2, and a bonding face 70db of the preliminary molded body 60d are bonded against each other and forms a bonding interface 7b. Further, a bonding face 70c1 of the preliminary molded body 60c1 and a bonding face 70c2 of the preliminary molded body 60c2 are bonded against each other and forms a bonding interface 7c.

As shown in FIG. 3, in the coil 4 of the inductor element 2B, the position of lead parts 5a and 5b is changed. That is, the lead parts 5a and 5b extend to the outside from approximately center of the coil in Z axis direction. Therefore, a guide groove 80 is formed to either one or both of the bonding faces 70c1 and 70c2.

As mentioned in above, the inductor element 2B has one more bonding interface compared to the inductor element 2A, thus a DC bias characteristic tends to improve.

Third Embodiment

Hereinafter, a third embodiment of the present invention is described based on FIG. 4. Note that, the same constitutions as the first embodiment and the second embodiment will be omitted from explaining, and the same numerical reference will be given.

Figure 4:
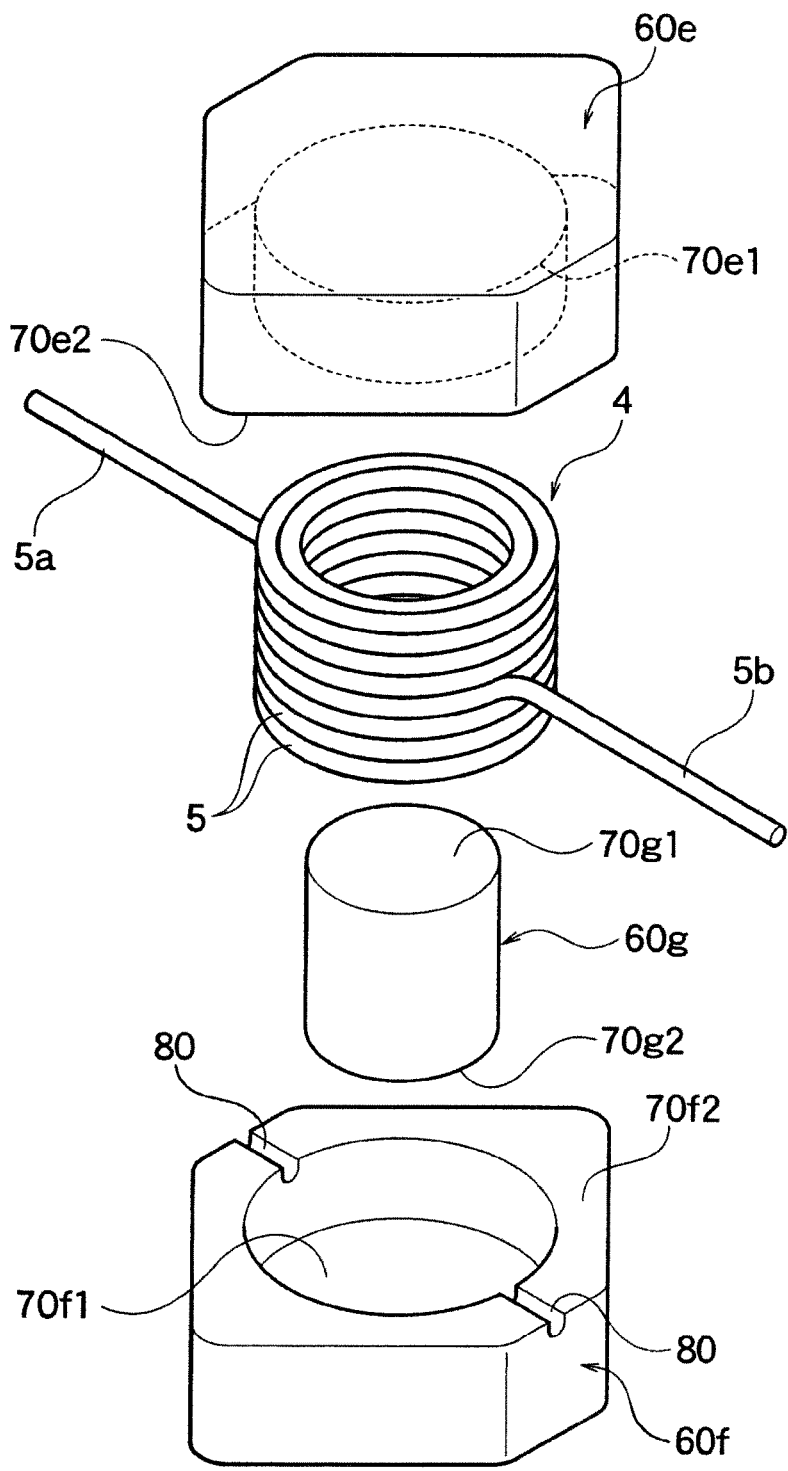
FIG. 4 is a perspective diagram of a preliminary molded body and a coil used in a production of the inductor element according to other embodiment of the present invention.

FIG. 4 is a perspective view of a preliminary molded body and an insert member during the production of the inductor element according to the third embodiment. As shown in FIG. 4, the third embodiment uses a preliminary molded body 60e having a pot shape which is equivalent of the preliminary molded bodies 60a and 60c1 of the second embodiment integrated into one form. Similarly, the preliminary molded body 60f has a pot shape which is equivalent of the preliminary molded bodies 60b and 60c2 of the second embodiment integrated into one form. Note that, the preliminary molded body 60g constituting the center part 6d is same as the first and second embodiments.

Therefore, in the third embodiment, the inductor element is produced by integrating the insert member and total of three preliminary molded bodies 60e to 60g into one body.

The preliminary molded body 60e is a member which becomes the top board part 6a and the outer circumference part 6c1 after the main compression, and it is produced by using two types of grains α and β having different resin contents. That is, a grain α is used for parts which becomes the top board part 6a; and a grain β is used for parts which becomes the outer circumference part 6c1. When the resin contents of the grains α and β are compared, the grain β has a larger resin content than the grain α. Note that, the specific value of the resin content in each part may be same as the first embodiment.

During the preliminary compression molding, the grain α is filled in the cavity which corresponds to the bottom of the pot shape in the metal mold having a pot shape which is for the preliminary molded body 60e; and the grain β is filled in the cavity which corresponds to the side wall part of the pot shape. By performing the preliminary compression molding as such, the core part 6 is constituted so that the resin content of the outer circumference part 6c1 is larger than the resin content of the top board part 6a. Note that, the conditions of the preliminary compression molding are same as the first embodiment.

The preliminary molded body 60f is a member which becomes the bottom board part 6b and the outer circumference part 6c2 after the main compression, and it is produced by using two types of grains α and β having different resin contents. The preliminary molded body 60f is also performed with the preliminary compression molding as similar to the preliminary molded body 60e, and the core part 6 is formed so that the resin content of the outer circumference part 6c2 is larger than the resin content of the bottom board part 6b.

As shown in the present embodiment, by producing the preliminary molded bodies 60e to 60g by filling the two types of grains and making the resin contents of the outer circumference parts 6c1 and 6c2 larger than the resin contents of the top board part 6a and also larger than the resin content of the bottom board part 6b, the adhesiveness between each part of the core part 6 is improved and prevents cracks from forming. Also, as similar to the first and second embodiments, the inductance can be improved.

Note that, the constitutions besides the above-mentioned in the third embodiment are same as the first and second embodiments, and same effects can be obtained.

Fourth Embodiment

Hereinafter, the fourth embodiment of the present invention is described based on FIG. 5 to FIG. 7. Note that, the constitutions of the fourth embodiment same as the third embodiment are omitted from explaining, and the same numerical references are given.

Figure 5:
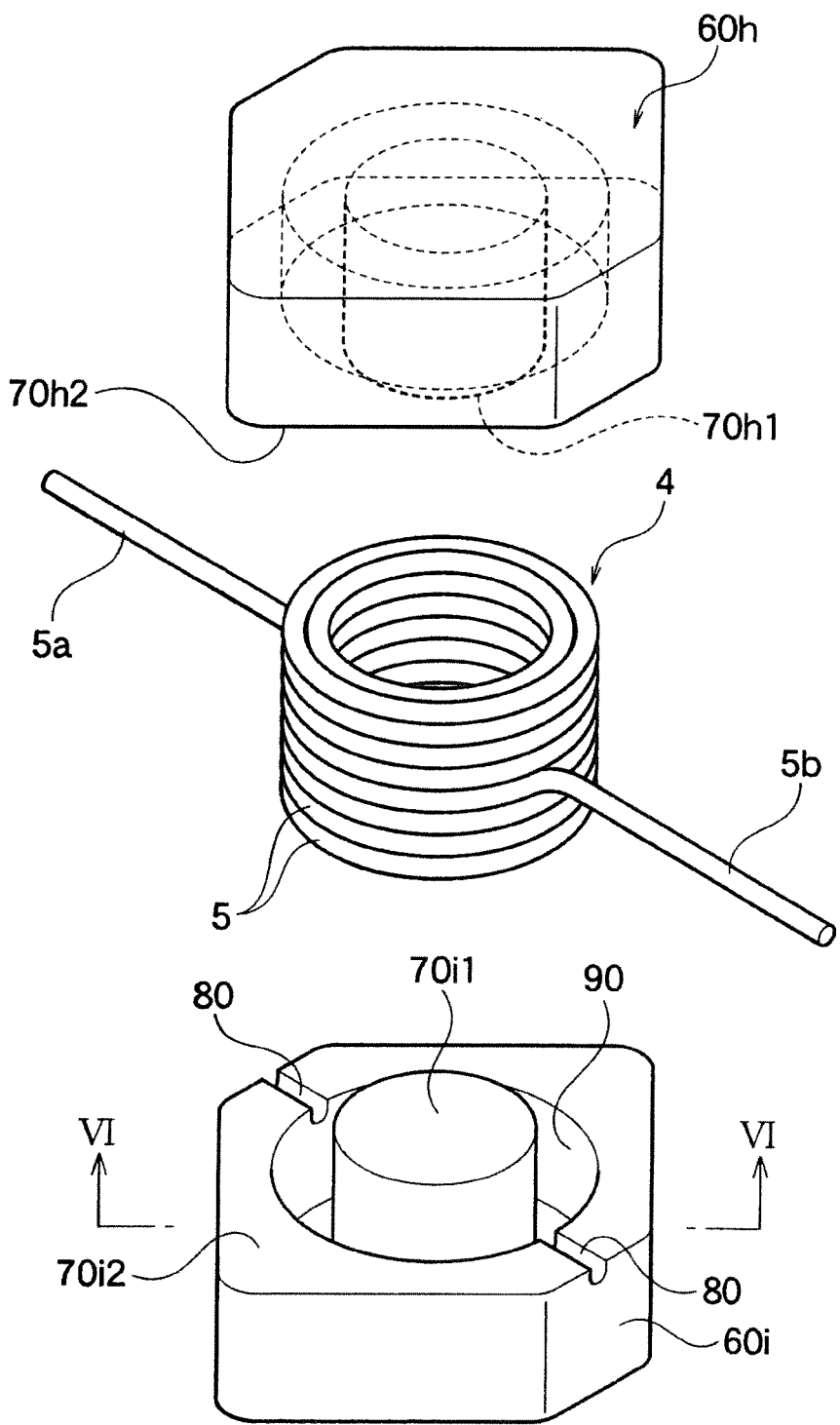
FIG. 5 is a perspective diagram of a preliminary molded body and a coil used in a production of the inductor element according to other embodiment of the present invention.

FIG. 5 is a perspective view of a preliminary molded body and an insert member during the production of the inductor element according to the fourth embodiment. Also, FIG. 6 is a cross section along VI-VI line shown in FIG. 5. As shown in FIG. 5 and FIG. 6, in the fourth embodiment, the inductor element is produced by integrating the coil and two preliminary molded bodies 60h and 60i into one body. The preliminary molded bodies 60h and 60i are E-E core in which the cross section is E shaped. The preliminary molded bodies 60h and 60i have connecting parts 60ha and 60ia which become the top board part 6a or the bottom board part 6b, side leg parts 60hc and 60ic which becomes the outer circumference part 6c, and center pillar parts 60hd and 60id which become the center part 6d.

Also, the preliminary molded body 60h is formed with the bonding faces 70h1 and 70h2; the preliminary molded body 60i is formed with the bonding faces 70i1 and 70i2. The bonding face 70h1 and the bonding face 70i1 are bonded; and the bonding face 70h2 and the bonding face 70i2 are bonded. Further, a guide groove 80 is formed to either one or both of the bonding faces 70h2 and 70i2 to pull the lead parts 5a and 5b to the outside of the core part 6. Note that, in FIG. 6, a pair of lead parts 5a and 5b is not shown.

Further, a housing groove 90 is formed between the side leg parts 60hc and 60ic and the center pillar parts 60hd and 60id in order to house upper half and lower half of the coil 4. A size of the housing groove 90 is about the size which allows to house the coil 4 as the insert member while the outer circumference of the coil and a winding end of the coil contact with the surface of the housing groove 90.

Figure 6:
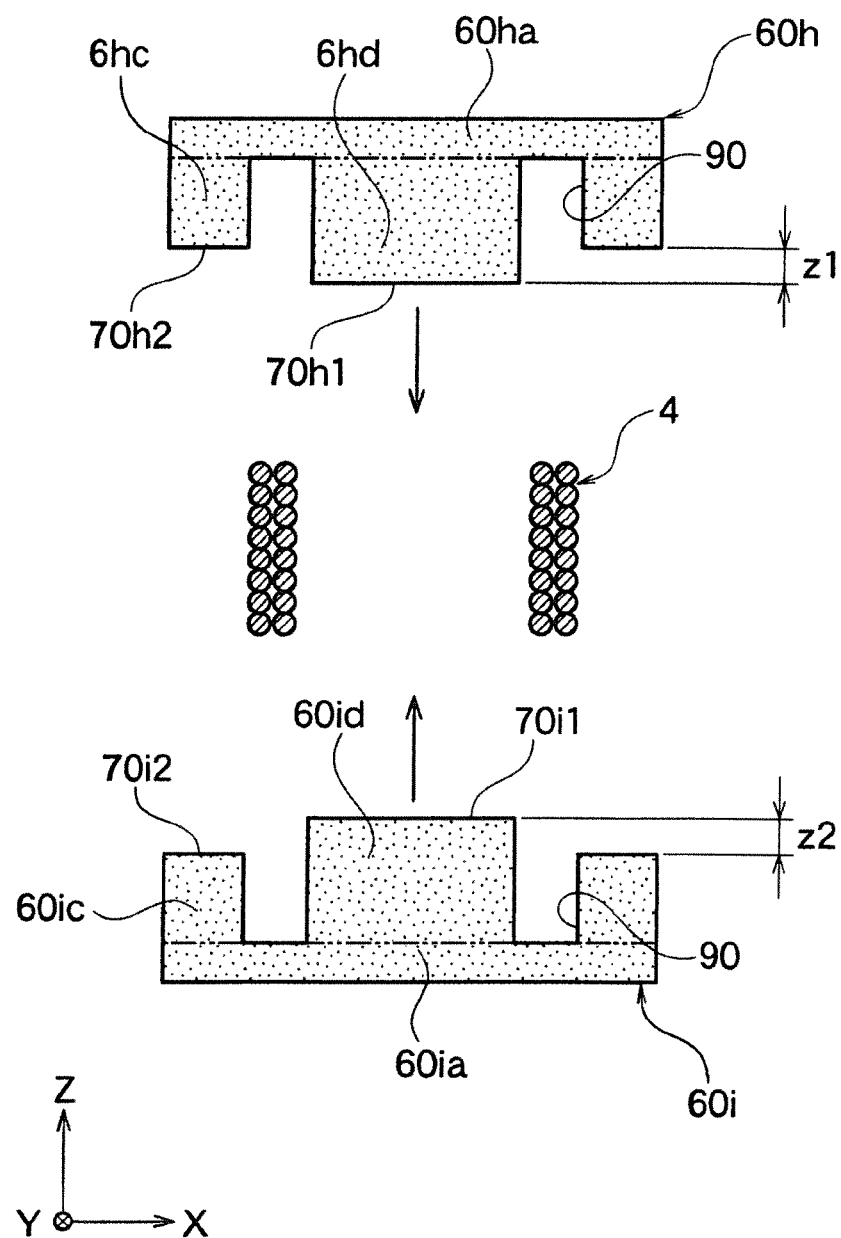
FIG. 6 is a cross section along VI-VI line shown in FIG. 5.

In the fourth embodiment, as shown in FIG. 6, a height of the center pillar part 60hd is higher than a height of the side leg part 60hc by a predetermined height z1. Similarly, a height of the center pillar part 60id is higher than a height of the side leg part 60ic by a predetermined height z2.

By designing the preliminary molded bodies 60h and 60i as such, a compression force applied to the center pillar parts 60hd and 60id during the main compression is greater than the compression force applied to the side leg parts 60hc and 60ic. Therefore, the core part 6 obtained in the present embodiment has a higher density of magnetic body of the center part 6d and contributes to improve the permeability.

Note that, the relation between the predetermined height z1 and the predetermined height z2 is not particularly limited. That is, it may be z1=z2, it may be z1>z2, and it may be z1<z2. Also, even for the first to third embodiments, by making the heights of the preliminary molded bodies 60d and 60g, which becomes the center part 6d, higher than height of the outer circumference part (60c), the same effect as the fourth embodiment can be attained.

Figure 7:
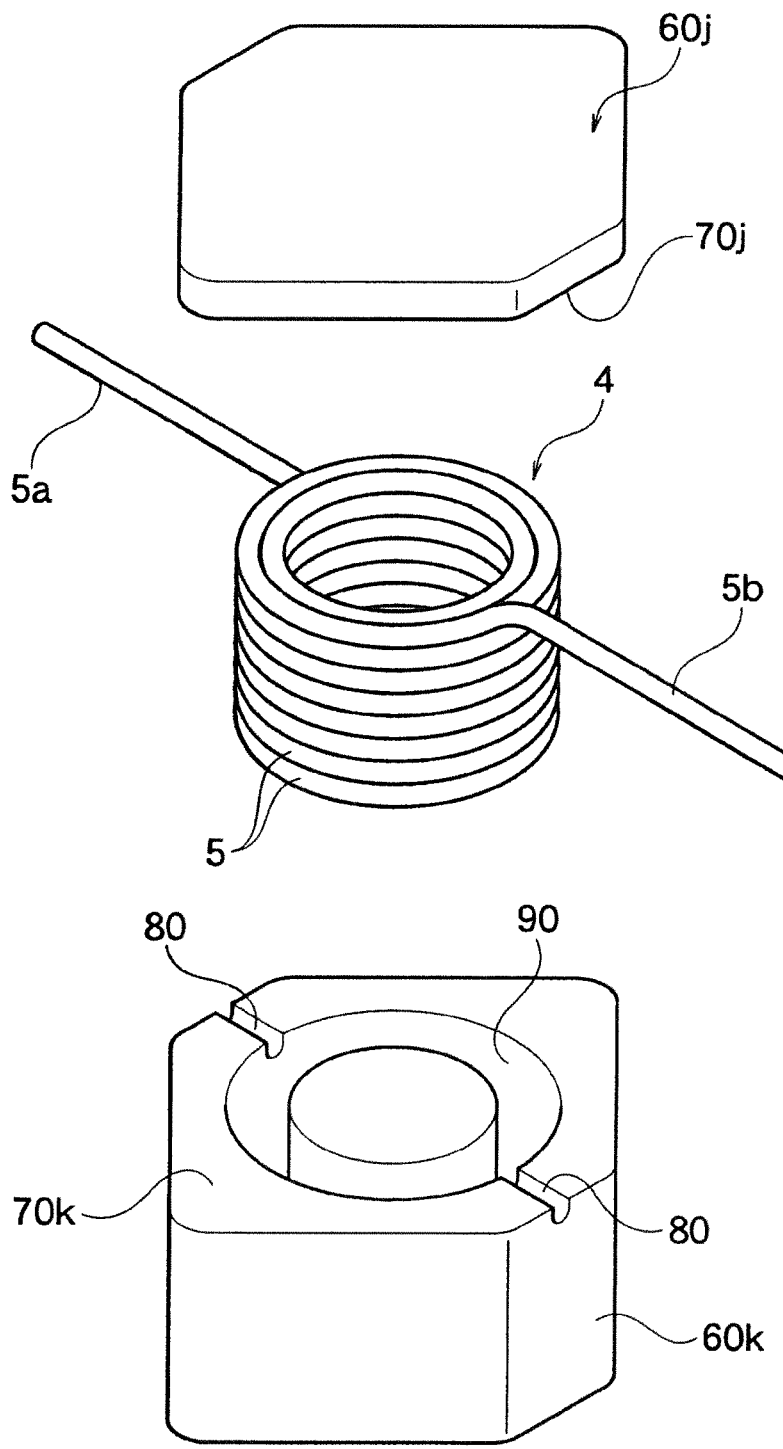
FIG. 7 is a perspective diagram of a preliminary molded body and a coil used in a production of the inductor element according to other embodiment of the present invention.

As a modified example of using the preliminary molded bodies divided in two such as in the fourth embodiment, an embodiment shown in FIG. 7 may be also considered. FIG. 7 shows a preliminary molded body 60j having a board shape which becomes the top board part 6a after the main compression, and a preliminary molded body 60k having a pot shape which becomes the bottom board part 6b, the outer circumference part 6c, and the center part 6d after the main compression. That is, the modified example shown in FIG. 7 is an inductor device of E-I core type.

Also, the constitutions of the fourth embodiment other than mentioned in above are same as the third embodiment and exhibits the same effects.

Note that, the present invention is not limited to the above-mentioned embodiments, and it may be modified within the scope of the present invention.

For example, in the above-mentioned embodiments, the step of preliminary compression is performed by a compression molding, however, it may be performed by a heat compression molding. A heat treatment temperature during the preliminary compression molding is preferably a temperature lower than a curing temperature of the resin. By heating at the preliminary compression molding, the permeability of the preliminary molded bodies 60a to 60k can be increased. Also, in the above-mentioned embodiment, a heat curing treatment is performed after the main compression, however, the main compression can be performed during the heat compression molding, and the curing treatment may be performed together with the main compression. A heating temperature in such case may be a temperature higher than the temperature at which the resin begins to cure.

Also, in the above-mentioned embodiment, a thermosetting resin is described as a used resin, however, a thermoplastic resin can be used as well. As the thermoplastic resin, polyphenylene sulfide (PPS), polypropylene (PP), liquid crystal polymer (LCP), and the like may be mentioned. Also, a composite resin of these may be mentioned. In case of using the thermoplastic resin, the preliminary compression and the main compression may be performed by an injection molding or a heat compression molding. The pressure in such case may be set so that a density of molded body is about the same as in case of using the thermosetting resin. A heating temperature may be determined based on properties of the used resin. Note that, in case of using the thermoplastic resin, the heating treatment to cure the resin does not necessarily have to be performed.

Further, as shown in the above-mentioned embodiment, the resin content of the center part 6d can be 0 parts by weight. In this case, the preliminary molded body constituting the center part 6d may be a sintered body of the magnetic powder.

Also, the materials of the magnetic powder and the resin constituting the core part 6 may differ depending on the parts 6a to 6d.

EXAMPLES

Hereinafter, the present invention is described based on further detailed examples, however, the present invention is not limited thereto.

Experiment 1

In Experiment 1, a preliminary molded body which was divided into five as shown in FIG. 3 was formed by a preliminary compression molding, and by performing a main compression molding, an inductor element 2B shown in FIG. 1B was obtained.

First, grains were prepared to produce the preliminary molded body. For a raw material of the grains, Fe—Si alloy of approximate sphere shape and having an average particle size of 25 μm was used as a magnetic powder and an epoxy resin was used as a resin. Note that, at a surface of the magnetic powder, an insulation coating was formed which was constituted by Si—O based oxide layer using a sol-gel method. Next, the above-mentioned magnetic powder and the epoxy resin diluted by acetone was mixed and stirred. Then, the mixture was passed through a mesh having an opening of 250 μm, then dried for 24 hours at room temperature, thereby the grains filling a cavity of a metal mold was obtained.

During the production of the grains, a charged amount of the resin was changed depending on preliminary molded bodies 60a to 60d as described in Examples 1 to 3 of Table 1. Note that, a resin content shows a ratio with respect to 100 parts by weight of the entire magnetic powder.

Next, the grains produced as mentioned in above were filled in the cavity of the metal mold, and preliminary compression molding was performed at a pressure of $6 \times 10^2$ MPa. Thereby, the preliminary molded bodies 60a, 60b, 60c1, 60c2, and 60d shown in FIG. 3 were obtained.

Next, as shown in FIG. 3, the above-mentioned preliminary molded bodies and the insert member were placed in a cavity of a metal mold different from the metal mold used in the preliminary compression molding. Note that, for the insert member, a coil 4 having an inner diameter of 3.2 mm and a height of 5.0 mm was used. After the preliminary molded bodies and the insert member were placed in the metal mold, the main compression was performed at a pressure of $3 \times 10^2$ MPa.

Then, the molded body was taken out of the metal mold, and a heat treatment was performed for one hour at 200° C. This temperature is higher than 130° C. which is the temperature the epoxy resin starts to cure. Thereby, the epoxy resin was cured. As such, a sample of the inductor device of Examples 1 to 3 shown in Table 1 was obtained. Note that, a size of the obtained core part was a vertical length 7.0 mm×horizontal length 7.0 mm×a height 5.0 mm.

Note that, five samples were produced per each example, and below evaluations were carried out.

Measurement of Inductance

For each obtained inductor element, an inductance L was measured. The measurement was performed for five times per each example and comparative example, and an average value is shown in Table 1 as a result of the measurement. Note that, the inductance was measured at a measurement frequency of 100 kHz and a measurement voltage of 0.5 mV using an LCR meter (made by Hewlett-Packard Company). When the inductance L was 40 μH or higher, then it was considered good.

Note that, a cross section of the obtained inductor element was subjected to an SEM observation, and a resin filling rate at each part (top board part, bottom board part, outer circumference part, and center part) of the core part was calculated. As a result, the calculated resin content and the resin charged amount were no different, and it was confirmed that the resin content and the resin charged amount were substantially the same.

Comparative Examples 1 to 5

In Comparative examples 1 to 5, a sample of an inductor element was produced as same as in Experiment 1, however, the resin content of the preliminary molded body was changed. In Table 1, the results of Examples and also the resin content and the inductance of the Comparative examples 1 to 5 are shown.

TABLE 1

| | Resin content (parts by weight) | | | | |
|---|---|---|---|---|---|
| Sample No. | Center part | Top board part | Bottom board part | Outer circumference part | Inductance (μH) |
| Comparative example 1 | 0.75 | 0.75 | 0.75 | 0.75 | unable to mold |
| Comparative example 2 | 2.0 | 2.0 | 2.0 | 2.0 | 31.4 |
| Comparative example 3 | 3.0 | 3.0 | 3.0 | 3.0 | 27.8 |
| Comparative example 4 | 2.0 | 2.0 | 2.0 | 0.75 | unable to mold |
| Comparative example 5 | 3.0 | 3.0 | 3.0 | 2.0 | 27.0 |
| Example 1 | 0.75 | 2.0 | 2.0 | 3.0 | 45.1 |
| Example 2 | 2.0 | 2.0 | 2.0 | 3.0 | 44.0 |
| Example 3 | 3.0 | 2.0 | 2.0 | 3.0 | 43.5 |

In Comparative example 1, the resin content was small in the core as a whole, hence a molding property was not good and a molded body was unable to maintain during a main compression. Similarly, in the Comparative example 4, the resin content of the outer circumference part is significantly smaller compared to other parts, hence the molding property was deteriorated and the molded body was unable to maintain during a main compression. Also, in Comparative example 2, the core part had cracks after the main compression. On the other hand, Examples 1 to 3 did not have any crack. As a result, by having more resin content in the outer circumference part compared to the resin content of the top board part and the resin content of the bottom board part, it was confirmed that cracks were suppressed from forming.

According to Table 1, Examples 1 to 3 in which the resin content of the outer circumference part was larger than the resin content of the top board part and also than the resin content of the bottom board part, the inductance was higher than Comparative examples 1 to 5. Particularly, Examples 2 and 3 had larger resin content in the core part as a whole compared to Comparative example 2 (that is, a ratio of the magnetic powder was small). By increasing the resin content, a content of magnetic material decreases in relativity, thus it is thought that the inductance decreased in theory. However, Examples 2 and 3 had a higher inductance than Comparative example 2. As a result, by increasing the resin content in the outer circumference part in relativity, the apparent permeability increased and an increase of inductance was proved.

This indicates that the apparent permeability of the core is influenced not only by a permeability of constituting materials but also by an adhesiveness between each part. Here, by making the resin content in the outer circumference part larger, the adhesiveness of the outer circumference part with the top board part and the bottom board part was improved, and as a result, the apparent permeability of the core improved, thereby it is thought that the inductance improved.

Further, Example 1 had a higher inductance Examples 2 and 3. Therefore, as shown in Example 1, by increasing the resin content in the order of the center part<the top board part (bottom board part)<the outer circumference part, it was confirmed that the adhesiveness of the core part was further enhanced and also the effect of improving the inductance was enhanced.

Experiment 2

In Experiment 2, a sample of an inductor device was produced as same as in Experiment 1, however, a resin content of a preliminary molded body was only changed. The resin content of each example in Experiment 2 is shown in Table 2.

In Examples 4 to 9, the resin contents of the top board part, the bottom board part, and the center part were fixed to 0.75 parts by weight with respect to 100 parts by weight of the magnetic powder; and the resin content of the outer circumference part was varied within a range of 1.5 parts by weight to 6.0 parts by weight.

Also, in Examples 10 to 13 and Comparative example 6, a resin content of the center part was set to 0.75 parts by weight with respect to 100 parts by weight of the magnetic powder and also a resin content of the outer circumference part was set to 5.0 parts by weight; then the resin contents of the top board part and the bottom board part were varied within a range of 0.25 to 5.0 parts by weight.

Further, in Examples 14 to 17, the resin contents of the top board part and the bottom board part were fixed to 2.0 parts by weight with respect to 100 parts by weight of the magnetic powder and the resin content of the outer circumference part was fixed to 3.0 parts by weight; then the resin content of the center part was varied within a range of 0 to 3.0 parts by weight.

TABLE 2

| | Resin content (parts by weight) | | | | Ratio of resin content | |
|---|---|---|---|---|---|---|
| Sample No. | Center part | Top board part | Bottom board part | Outer circumference part | Outer circumference part/Top board part (bottom board part) | Inductance (μH) |
| Example 4 | 0.75 | 0.75 | 0.75 | 1.5 | 2.0 | 41.9 |
| Example 5 | 0.75 | 0.75 | 0.75 | 2.0 | 2.7 | 43.2 |
| Example 6 | 0.75 | 0.75 | 0.75 | 3.0 | 4.0 | 44.2 |
| Example 7 | 0.75 | 0.75 | 0.75 | 4.0 | 5.3 | 43.8 |
| Example 8 | 0.75 | 0.75 | 0.75 | 5.0 | 6.7 | 42.0 |
| Example 9 | 0.75 | 0.75 | 0.75 | 6.0 | 8.0 | 40.0 |

TABLE 2-continued

| | Resin content (parts by weight) | | | | Ratio of resin content | |
|---|---|---|---|---|---|---|
| Sample No. | Center part | Top board part | Bottom board part | Outer circumference part | Outer circumference part/Top board part (bottom board part) | Inductance (μH) |
| Example 10 | 0.75 | 0.25 | 0.25 | 5.0 | 20 | 40.8 |
| Example 11 | 0.75 | 0.50 | 0.50 | 5.0 | 10 | 42.1 |
| Example 12 | 0.75 | 3.0 | 3.0 | 5.0 | 1.7 | 42.2 |
| Example 13 | 0.75 | 4.0 | 4.0 | 5.0 | 1.3 | 42.0 |
| Comparative example 6 | 0.75 | 5.0 | 5.0 | 5.0 | 1.0 | 38.7 |
| Example 14 | 0 | 2.0 | 2.0 | 3.0 | 1.5 | 41.8 |
| Example 15 | 1.0 | 2.0 | 2.0 | 3.0 | 1.5 | 44.2 |
| Example 16 | 2.0 | 2.0 | 2.0 | 3.0 | 1.5 | 43.2 |
| Example 17 | 3.0 | 2.0 | 2.0 | 3.0 | 1.5 | 40.1 |

As shown in Table 2, in Examples 4 to 9, the outer circumference part had a larger resin content than in the top board part and also than in the bottom board part, hence Examples 4 to 9 had a higher inductance compared to Comparative examples 1 to 5. Particularly, Examples 5 to 8 in which the resin content of the outer circumference part was within a range of 2.0 to 5.0 parts by weight had an inductance of 42 μH or more, and it was confirmed to be effective to improve the properties of the inductor element.

Also, in Examples 5 and 6, the resin contents were the same except for the outer circumference part. Example 6 had a larger resin content in a core part as a whole compared to Example 5. Nevertheless, Example 6 had a higher inductance than Example 5. According to the result, it can be understood that a ratio of the resin content of the outer circumference part with respect to the top board part and the bottom board part contributed to improve the inductance.

Example 9 showed a decreased inductance compared to Examples 4 to 8. As the resin content of the outer circumference part increases, the adhesiveness improves, but on the other hand, the magnetic powder amount decreased and the permeability at the outer circumference part decreased, thus the inductance decreased. When the resin content of the outer circumference part was larger than 6.0 parts by weight, the decrease of permeability caused by the decrease of magnetic powder amount had a greater impact on the inductance as a device than the increase of inductance caused by an improved adhesiveness. According to this result, it can be understood that the resin content of the outer circumference part is preferably 6.0 part by weight or less.

In Examples 11 to 13, the resin contents of the top board part and the bottom board part were within a range of 0.5 to 4.0 parts by weight and had even higher inductance compared to Example 10 and Comparative example 6 in which the resin contents of the top board part and the bottom board part were out of this range. Therefore, by setting the resin contents of the top board part and the bottom board part within this range, it was confirmed to be effective to improve the properties of the inductor element.

In Examples 14 to 16, the resin content of the center part was 2.0 parts by weight or less and had even higher inductance compared to Example 17 which included 2.0 parts by weight or more of the resin content of the center part. Therefore, by setting the resin content of the center part within the above-mentioned range, it was confirmed to be effective to improve the properties of the inductor element.

The center part is an area where a magnetic flux passes through, compared to other parts, thus the permeability constituting the center part had larger impact on the inductance as a device. That is, regarding the center part, in terms of inductance as the device, it is more effective to improve the permeability of the center part than to increase the inductance caused by an improved adhesiveness. Examples 14 to 16 had a smaller resin content compared to Example 17 and had a larger content of a magnetic powder. That is, Examples 14 to 16 had a larger permeability of the center part compared to Example 17. As a result, it is apparent that the resin content of the center part is preferably 2.0 parts by weight or less.

Experiment 3

In Experiment 3, a sample of an inductance element as similar to Experiment 1 was formed using a different type of resin. As the resin, a phenol resin, a melamine resin, a urea resin, a furan resin, an alkyd resin, an unsaturated polyester resin, a diallylphthalate resin, and the like, polyphenylene sulfide (PPS), polypropylene (PP), and liquid crystal polymer (LCP) were used.

As result, even in case of using any one of the above resins, by making the resin content of the outer circumference part larger than the resin content of other parts, the inductance tended to improve.

NUMERICAL REFERENCES 2,2A,2B . . . Inductor element
4 . . . Coil
4α . . . Center axis
5 . . . Conductor
5a,5B . . . Lead part
6 . . . Core part
6a . . . Top board part
6b . . . Bottom board part
6c,6c1,6c2 . . . Outer circumference part
6d . . . Center part
6e . . . Space
7,7a,7b,7c . . . Bonding interface
60a to 60k . . . Preliminary molded body
70a to 70k . . . Bonding face
80 . . . Guide groove
90 . . . Housing groove

What is claimed is:

1. An inductor element comprising a coil having a conductor wound in a coil form, and a core part surrounding the coil and including a magnetic powder and a resin, wherein the core part comprises
- a top board part in contact with an upper end face of the coil and covering the upper end face,
- a bottom board part in contact with a lower end face of the coil and covering the lower end face,
- an outer circumference part positioned at an outer circumference side of the coil, and
- a center part positioned at an inner circumference side of the coil, a resin content of the outer circumference part is larger than a resin content of the top board part and also larger than a resin content of the bottom board part, and a resin content of the center part is smaller than the resin content of the top board part and also smaller than the resin content of the bottom board part.

2. The inductor element according to claim 1, wherein
the resin content of the top board part is 0.5 to 4.0 parts by weight with respect to 100 parts by weight of the magnetic powder,
the resin content of the bottom board part is 0.5 to 4.0 parts by weight with respect to 100 parts by weight of the magnetic powder, and
the resin content of the outer circumference part is 2.0 to 6.0 parts by weight with respect to 100 parts by weight of the magnetic powder.

3. The inductor element according to claim 2, wherein
the resin content of the center part is 2.0 parts by weight or less with respect to 100 parts by weight of the magnetic powder.

4. The inductor element according to claim 1, wherein
the resin content of the center part is 2.0 parts by weight or less with respect to 100 parts by weight of the magnetic powder.

5. The inductor element according to claim 1, wherein the resin content of the outer circumference part is 1.5 times or more of the resin content of the top board part or the resin content of the bottom board part.

6. The inductor element according to claim 5, wherein the resin content of the center part is 2.0 parts by weight or less with respect to 100 parts by weight of the magnetic powder.

7. The inductor element according to claim 1, wherein the resin content of the outer circumference part is within a range of 2.0 parts by weight to 5.0 parts by weight with respect to 100 parts by weight of the magnetic powder.

8. The inductor element according to claim 1, wherein the resin content of the center part is 0.15 times or more and less than 1.0 times of the resin content of the top board part and of the resin content of the bottom board part.

* * * * *